United States Patent
Takahama et al.

(10) Patent No.: US 8,755,089 B2
(45) Date of Patent: Jun. 17, 2014

(54) IMAGE SCANNING APPARATUS

(75) Inventors: Hidekazu Takahama, Nagoya (JP);
Hiroshi Murakami, Nagoya (JP);
Hideyuki Hashimoto, Toyokawa (JP);
Akira Ohhata, Toyokawa (JP);
Hiroyuki Suzuki, Toyokawa (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 1187 days.

(21) Appl. No.: 12/414,421

(22) Filed: Mar. 30, 2009

(65) Prior Publication Data
US 2009/0310191 A1 Dec. 17, 2009

(30) Foreign Application Priority Data
Jun. 17, 2008 (JP) .................. 2008-158229

(51) Int. Cl.
*H04N 1/04* (2006.01)
(52) U.S. Cl.
USPC ........................................ 358/474; 358/1.14
(58) Field of Classification Search
USPC ................................. 358/1.14, 474
See application file for complete search history.

(56) References Cited

U.S. PATENT DOCUMENTS

| | | | |
|---|---|---|---|
| 2003/0227654 A1 | 12/2003 | Shiraishi | |
| 2007/0097411 A1* | 5/2007 | Kondo et al. | 358/1.14 |
| 2008/0112019 A1 | 5/2008 | Kawaguchi | |
| 2008/0144061 A1* | 6/2008 | Han | 358/1.9 |

FOREIGN PATENT DOCUMENTS

| | | | |
|---|---|---|---|
| JP | 2003-150010 | 5/2003 | |
| JP | 2004-15299 | 1/2004 | |
| JP | 2005-12442 | 1/2005 | |
| JP | 2005-142917 | 6/2005 | |
| JP | 2007-74500 | 3/2007 | |
| JP | 2007-124523 | 5/2007 | |
| JP | 2007-281791 | 10/2007 | |
| JP | 2008-22262 | 1/2008 | |
| JP | 2008022262 | * 1/2008 | ............... G06T 1/00 |
| JP | 2008-125029 | 5/2008 | |

OTHER PUBLICATIONS

English machine translation of JP2008022262.*
Japanese Notice of Grounds of Rejection mailed May 11, 2010, directed to counterpart Japanese Application No. 2008-158229; 6 pages.

* cited by examiner

*Primary Examiner* — King Poon
*Assistant Examiner* — Iriana Cruz
(74) *Attorney, Agent, or Firm* — Buchanan Ingersoll & Rooney PC

(57) ABSTRACT

An image scanning apparatus includes a transport roller transporting an original, a CCD scanning a first side of the original, a CIS scanning unit scanning a second side of the original, and a flap for reversing the original and sending the original to a transport path. A CPU controls the transport roller, the CCD and the CIS scanning unit to scan each side of the original. The CPU determines from the result of scanning whether or not each side of the original includes a predetermined pattern. When the CPU cannot identify from the result of scanning of the second side whether or not the second side includes a predetermined pattern, the CPU controls the flap and a transport unit to reverse the original and cause the CCD to scan the second side.

11 Claims, 10 Drawing Sheets

IMAGE SCANNING APPARATUS

This application is based on Japanese Patent Application No. 2008-158229 filed with the Japan Patent Office on Jun. 17, 2008, the entire content of which is hereby incorporated by reference.

BACKGROUND OF THE INVENTION

1. Field of the Invention

The present invention relates to an image scanning apparatus scanning an original to detect a predetermined pattern included in the original.

2. Description of the Related Art

In recent years, for the purpose of preventing unauthorized copy of an original, an image scanning apparatus having bill recognition capability or security screen pattern capability has been developed.

The bill recognition is a technology of determining whether or not an original is a special one such as bill or valuable paper. The bill recognition is generally achieved by examining whether or not image data obtained by scanning an original includes a specific pattern.

Further, the security screen pattern is a technology of printing in advance, on an original image, a character string or the like such as "copy prohibited" as a screen pattern that reappears on a copy of the original. The security screen pattern can prevent unauthorized copy of a confidential document. Japanese Laid-Open Patent Publication No. 2005-142917 discloses an image processing apparatus that determines, based on the dot density of image data, whether or not the image data obtained by scanning an original with a scanner is a confidential document.

The image scanning apparatus thus scans an original to determine whether or not the original includes a pattern specific to a bill or a predetermined pattern such as screen pattern. The image scanning apparatus can use the result of the determination to prevent unauthorized copy of the original.

Consideration will be given here to an original whose opposing two sides are both printed with respective images. It is supposed that, if at least one side of the original is printed with a predetermined pattern as described above, the images on the opposing two sides are intended to be prevented from being copied unauthorizedly. Actually, however, an apparatus scanning only one side of the original can scan the side without the predetermined pattern. Therefore, in order to surely determine whether or not the original includes the predetermined pattern, it is necessary to scan both sides of the original.

A method for scanning both sides of an original is to combine one-side scanning and reversal of an original.

Another method for scanning both sides of an original is to use an image scanning apparatus including two scanning units (first scanning unit and second scanning unit). According to this method, the image scanning apparatus scans a first side of the original using the first scanning unit, and scans a second side of the original using the second scanning unit. This method is hereinafter referred to as simultaneous double-side scanning. The simultaneous double-side scanning requires a large-sized apparatus including two image scanning units. The simultaneous double-side scanning, however, can shorten the time required for scanning. The simultaneous double-side scanning is therefore widely used.

Some image scanning apparatuses for use in simultaneous double-side scanning include a scanning unit configured with a combination of a CCD (Charge-Coupled Device) and a CIS (Contact Image Sensor).

The CCD scans, via a reduction optical system, the light that is emitted from a light source such as halogen lamp or xenon bulb lamp to an original and reflected from the original. The CIS scans the light emitted from an LED (Light Emitting Diode) light source to an original where the size of the scan light is identical to the original size.

Scanning with the CIS is shallower in depth of field as compared with scanning with the CCD, resulting in an out-of-focus state even when the fed original is displaced to a slight degree. Thus, the accuracy of scanning with the CIS is low. In the case of scanning with the CCD, however, an optical system has to be provided between an original and the CCD. Thus, scanning with the CCD has a disadvantage that a large space is necessary. Both the high scanning accuracy and the downsizing of the apparatus can be accomplished by combining the CIS scanning and the CCD scanning.

Japanese Laid-Open Patent Publication No. 2007-074500 discloses an image scanning apparatus having an original reversal mechanism. The image scanning apparatus disclosed in Japanese Laid-Open Patent Publication No. 2007-074500 includes a CCD scanning unit and a CIS scanning unit. The CCD scanning unit can scan both of a monochrome image and a color image. While the CIS scanning unit can scan a monochrome image only, the CIS scanning unit can determine whether a scan image is a monochrome image or color image. Only in the case where the image scanned by the CIS scanning unit is a color image, the image scanning apparatus reverses the original and scans the original again. In this way, the image scanning apparatus can efficiently scan a plurality of originals including a color image and a monochrome image.

Japanese Laid-Open Patent Publication No. 2005-012442 discloses an image scanning apparatus performing the simultaneous double-side scanning with a CCD and a CIS in a speed-priority mode. This image scanning apparatus scans the front side and the rear side of an original using the CCD in an image-quality-priority mode.

If the simultaneous double-side scanning technology by means of the CIS and CCD in combination is directly applied, it may not be accurately determined whether or not an original includes a predetermined pattern, because the accuracy of scanning with the CIS and the accuracy of scanning with the CCD differ from each other.

SUMMARY OF THE INVENTION

The present invention has been made to solve the problems above. A main object of the present invention is to provide an image scanning apparatus scanning an original with two different types of scanning apparatuses with respective scanning accuracies different from each other, and capable of highly accurately determining whether or not the original includes a predetermined pattern.

According to an aspect of the present invention, an image scanning apparatus is provided. The image scanning apparatus includes a first scanner, a second scanner, a determination unit, and a control unit. The first scanner scans a first side of an original with a first scanning accuracy to generate first image data. The second scanner scans a second side of the original with a second scanning accuracy lower than the first scanning accuracy to generate second image data. The determination unit determines whether or not each of the first image data and the second image data includes a predetermined pattern. The control unit causes the first scanner to scan the second side when the determination unit determines that whether the second image data includes the predetermined pattern is indeterminate.

Preferably, the determination unit includes a calculation unit calculating a degree to which each of the first and the second image data includes the predetermined pattern. The determination unit determines, based on the degree, whether or not each of the first image data and the second image data includes the predetermined pattern. The control unit controls the first scanner such that the first scanner scans the second side when the degree of the second image falls within a predetermined range.

More preferably, the determination unit determines that the first image data includes the predetermined pattern when the degree of the first image data exceeds a first criterion. The determination unit determines that the first image data does not include the predetermined pattern when the degree of the first image data does not exceed the first criterion. The determination unit determines that the second image data includes the predetermined pattern when the degree of the second image data exceeds a second criterion. The determination unit determines that the second image data does not include the predetermined pattern when the degree of the second image data does not exceed a third criterion.

More preferably, a value of the first criterion is not less than the third criterion and not more than the second criterion.

Preferably, when the determination unit determines that the first image data includes the predetermined pattern, the control unit keeps the first scanner from scanning the second side regardless of a result of determination for the second side by the determination unit.

More preferably, the predetermined pattern is a pattern representing prohibition of output of image data. When the determination unit determines that the first image data or the second image data includes the predetermined pattern, the control unit prohibits output of respective images corresponding to the first image data and the second image data.

More preferably, the predetermined pattern is a pattern for identifying the original as a bill.

Preferably, when the determination unit determines that the first image data does not include the predetermined pattern, the control unit keeps the first scanner from scanning the second side regardless of a result of determination for the second side by the determination unit.

More preferably, the predetermined pattern is a pattern representing permission of output of the first image data and the second image data. When the determination unit determines that neither the first image data nor the second image data includes the predetermined pattern, the control unit prohibits output of respective images corresponding to the first image data and the second image data.

Preferably, the image scanning apparatus further includes a transport unit transporting the original, and a reversal unit reversing the original when the original whose second side is scanned by the second scanner is transported to the first scanner by the transport unit. The control unit causes the first scanner to scan the second side by controlling the transport unit and the reversal unit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
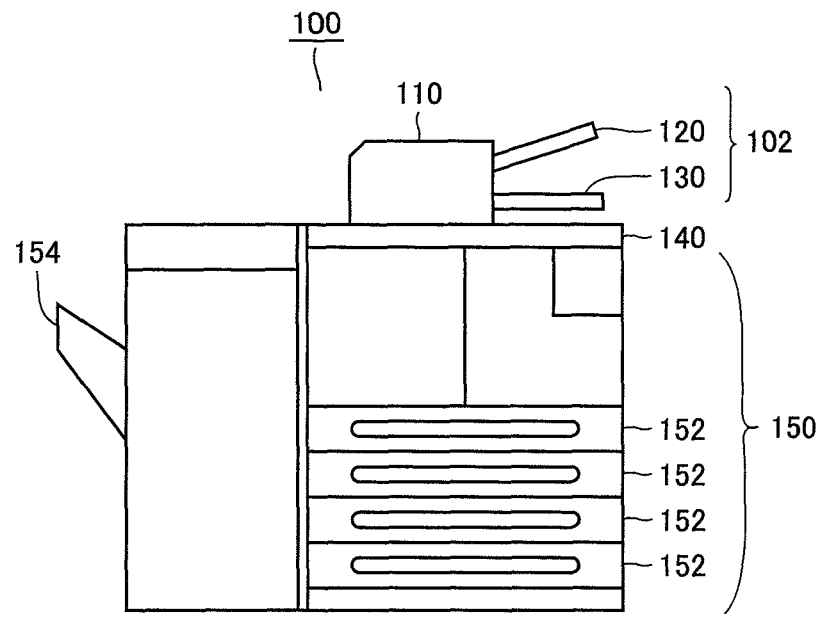
FIG. 1 is a schematic diagram of an image processing apparatus.

Embodiments of the present invention will be described hereinafter with reference to the drawings. In the following description, like components are denoted by like reference characters. The components are named identically and function identically as well. Therefore, a detailed description thereof will not be repeated.

First Embodiment

FIG. 1 is a schematic diagram of an image processing apparatus 100 according to the present embodiment. Image processing apparatus 100 includes an image scanning apparatus 102 and a print unit 150. Image scanning apparatus 102 includes an upper unit 110, an original tray 120, an original catch tray 130, and a lower unit 140. Print unit 150 includes a plurality of paper feed trays 152 and a catch tray 154.

On original tray 120, an original to be transported to upper unit 110 is set. Onto original catch tray 130, the original is ejected from upper unit 110.

Figure 2:
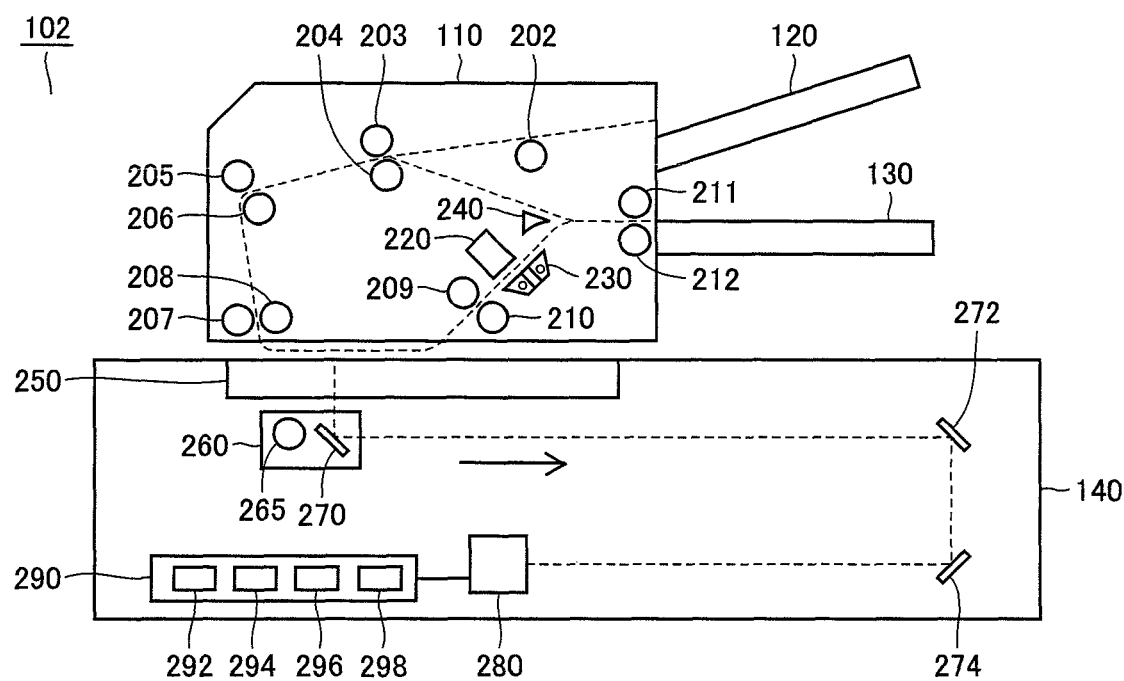
FIG. 2 is a cross section of an image scanning apparatus.

Details of image scanning apparatus 102 will be described now with reference to FIG. 2. FIG. 2 is a cross section of image scanning apparatus 102.

Upper unit 110 includes transport rollers 202-212, a CIS scanning unit 220, a member 230, and a flap 240.

Transport rollers 202-212 each transport the original which is set on original tray 120, and finally eject the original onto original catch tray 130.

CIS scanning unit 220 applies LED (Light Emitting Diode) light to the original. CIS scanning unit 220 also detects the LED light reflected from the original. Further, CIS scanning unit 220 generates image data (hereinafter scan data) according to the result of the detection.

Member 230 presses the original against CIS scanning unit 220 while transporting the original. Flap 240 switches the transport path of the original carried by transport roller 211 and transport roller 212 into the transport path so as to turn the original upside down.

Lower unit 140 includes a transparent platen 250, a movable stage 260, a light source 265, a first mirror 270, a second mirror 272, a third mirror 274, a CCD 280, and a processing unit 290. Light source 265 and first mirror 270 are placed on movable stage 260.

The original is placed on platen 250. Movable stage 260 moves under platen 250 in the direction indicated by the arrow in the drawing. Light source 265 applies light to the original. First mirror 270 receives the light reflected from the original. First mirror 270, second mirror 272 and third mirror 274 are arranged in such a manner that directs the light from the original to CCD 280. CCD 280 detects the light reflected from the original to generate scan data according to the result of the detection.

Processing unit 290 includes a CPU (Central Processing Unit) 292, a RAM (Random-Access Memory) 294, a ROM (Read-Only Memory) 296, and a flash memory 298.

CPU 292 controls the operation of each component of image processing apparatus 100. RAM 294 stores temporary data generated while CPU 292 executes a process. ROM 296 stores a program or the like for controlling image processing apparatus 100. Flash memory 298 stores image data such as scan data scanned by a scanning unit, a determination level used when a determination is made as to whether or not an original includes a predetermined pattern, a reference pattern used as a reference for the determination, and set values or the like for the copy such as the number of copies to be made and sheet size.

It is supposed here that CPU 292, RAM 294, ROM 296, and flash memory 298 are included in lower unit 140. The locations where these components are provided, however, are not limited to the inside of lower unit 140.

Referring back to FIG. 1, print unit 150 prints the scanned original on a recording medium such as a sheet of paper supplied to paper feed tray 152. Namely, print unit 150 prints an image on a sheet of paper, based on the scan data that are output respectively from CIS scanning unit 220 and CCD 280. Print unit 150 also exits the sheet of paper printed with the image to catch tray 154.

Figure 3:
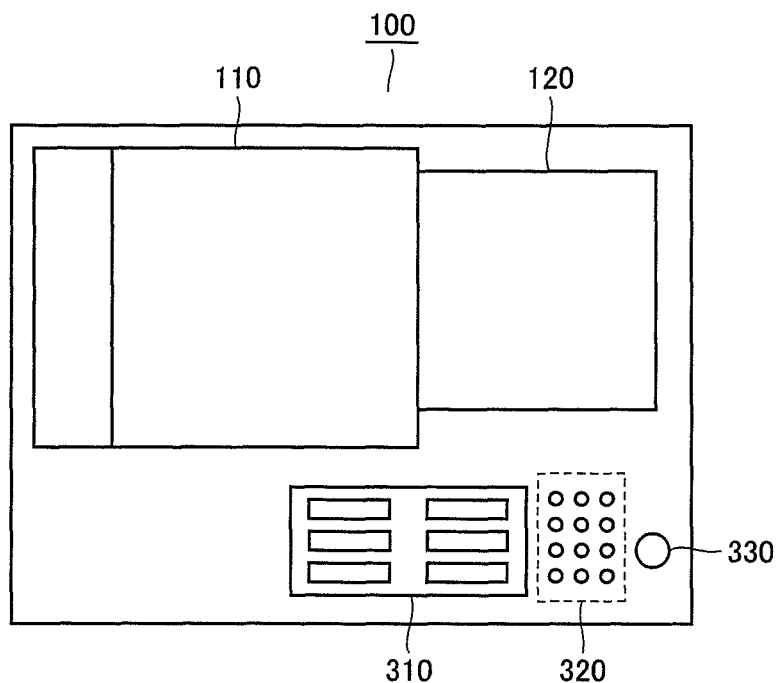
FIG. 3 is a top view of the image processing apparatus.

FIG. 3 is a top view of image processing apparatus 100. Referring to FIG. 3, an operation panel 310, an input key set 320 and a start key 330 are disposed on the top surface of lower unit 140.

Operation panel 310 receives an instruction of a user. Operation panel 310 also displays various information that can be set by the user for image processing apparatus 100, such as output condition settings. Input key set 320 includes for example numerical keys and a clear key. As an input key 320 is pressed down, a set value such as an output condition is input to image processing apparatus 100. As start key 330 is pressed down, image processing apparatus 100 starts printing image data according to the input set value.

Figure 4:
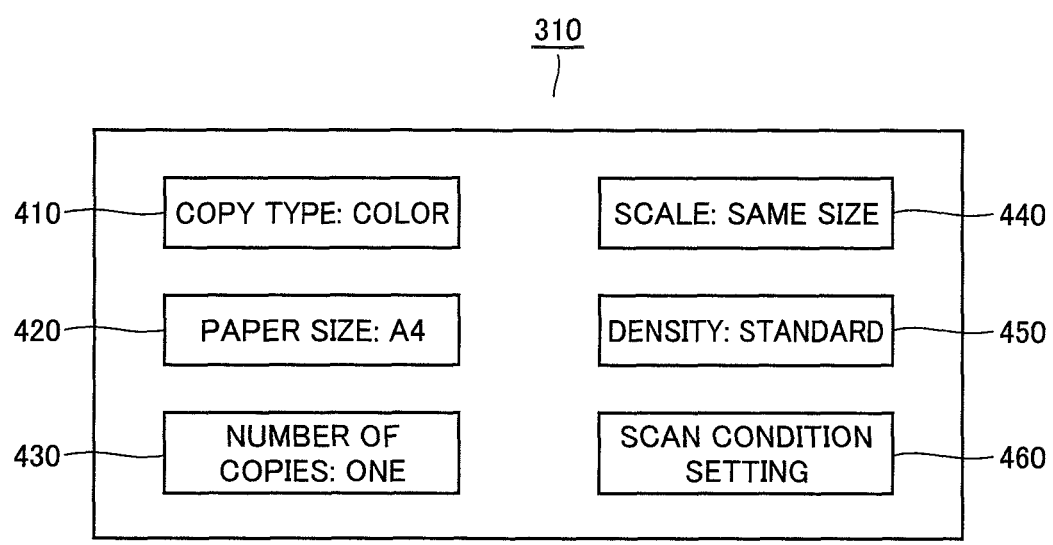
FIG. 4 is a diagram showing an example of a display screen of an operation panel.

FIG. 4 is a diagram showing an example of the display screen of operation panel 310. Operation panel 310 indicates a copy type area 410, a paper size area 420, a copy number area 430, a scale area 440, a density area 450, and a scan condition setting area 460. As a user touches a portion corresponding to each area on operation panel 310, the area is selected.

When copy type area 410 is selected, operation panel 310 indicates a screen for allowing the user to select color printing or monochrome printing. As the user performs an operation, for example, touches operation panel 310, the copy type is determined as color copy or monochrome copy. The screen indicated on operation panel 310 when copy type area 410 is selected may naturally include an indication for setting other copy types.

When paper size area 420 is selected, operation panel 310 indicates a screen for allowing the user to select a paper size. As the user performs an operation, for example, touches operation panel 310, the paper size is determined.

When copy number area 430 is selected, operation panel 310 indicates a screen for allowing the user to input the number of copies to be made. As the user performs an operation, for example, touches operation panel 310, or presses a numerical key(s) of input key set 320, the number of copies is determined.

When scale area 440 is selected, operation panel 310 indicates a screen for allowing the user to select (input) the scale or degree of enlargement/reduction of an output image relative to the original. As the user performs an operation, for example, touches operation panel 310, the scale is determined.

When density area 450 is selected, operation panel 310 indicates a screen for allowing the user to select an output density setting. As the user performs an operation, for example, touches operation panel 310, the density is determined.

When scan condition setting area 460 is selected, operation panel 310 indicates a screen for allowing the user to select a scanning condition of the original. As the user performs an operation, for example, touches operation panel 310, the scan condition is determined.

Regarding the image processing apparatus in the present embodiment, the scan condition includes, in addition to the resolution or the like, a determination level. The determination level is used when CPU 292 determines whether a scanned original is a bill or the scanned original includes security information such as a screen pattern. Details of the determination level will be described hereinlater.

Figure 5:
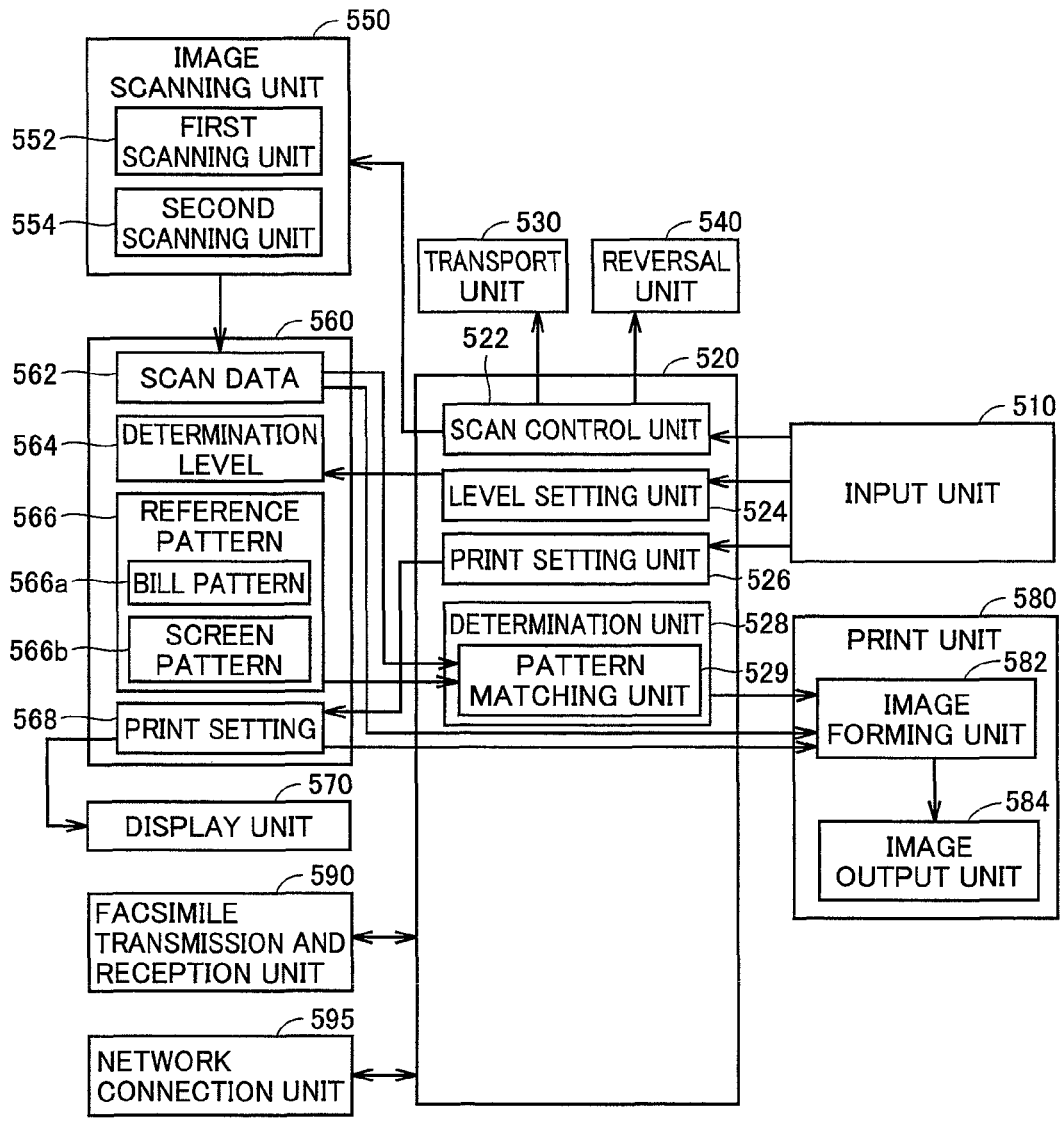
FIG. 5 is a block diagram showing a functional configuration of the image processing apparatus.

FIG. 5 is a block diagram showing a functional configuration of image processing apparatus 100. Referring to FIG. 5, the functional configuration of image processing apparatus 100 will be described below.

Image processing apparatus 100 includes an input unit 510, a control unit 520, a transport unit 530, a reversal unit 540, an image scanning unit 550, a storage unit 560, a display unit 570, a print unit 580, an image facsimile transmission and reception unit 590, and a network connection unit 595.

Input unit 510 receives an instruction given from the outside. In the present embodiment, operation panel 310, input key set 320 and start key 330 correspond to input unit 510.

Control unit 520 controls the operation of image processing apparatus 100 based on the instruction received by input unit 510 or the like. In the present embodiment, CPU 292 corresponds to control unit 520. Each function of control unit 520 may be implemented by hardware.

Control unit 520 includes a scan control unit 522, a level setting unit 524, a print setting unit 526, and a determination unit 528. Determination unit 528 has a pattern matching unit 529.

Scan control unit 522 controls transport unit 530 and image scanning unit 550 based on an instruction so as to scan the original. Further, when it cannot be determined whether image data on a side scanned by CIS scanning unit 220 in the first scanning operation includes a predetermined pattern, scan control unit 522 controls transport unit 530, reversal unit 540 and image scanning unit 550 so that image scanning unit 550 scans the original again.

Level setting unit 524 sets a determination level 564 used for determining whether or not the original includes a predetermined pattern, based on an instruction.

Print setting unit 526 sets various information such as output condition at print setting 568 in storage unit 560.

Pattern matching unit 529 calculates the rate of agreement with (or rate of detection of) a reference pattern 566 of scan data 562. Determination unit 528 determines whether or not the original includes reference pattern 566 based on the rate of agreement (or rate of detection) as well as determination level 564, and outputs the result of the determination to print unit 580. Details of reference pattern 566, the rate of agreement and the rate of detection will be described hereinlater.

Transport unit 530 transports the original. In the present embodiment, transport rollers 202-212 each and member 230 correspond to transport unit 530. It should be noted that the component(s) used as transport unit 530 is not limited to them.

Reversal unit 540 turns the original upside down in the transport path. In the present embodiment, flap 240, transport roller 211 and transport roller 212 correspond to reversal unit 540.

Image scanning unit 550 scans the original to output scan data 562 to storage unit 560. Image scanning unit 550 includes a first scanning unit 552 and a second scanning unit 554. It is supposed here that the accuracy in scanning the original by first scanning unit 552 is higher than the accuracy in scanning the original by second scanning unit 554. In the present embodiment, movable stage 260, light source 265, first mirror 270, second mirror 272, third mirror 274, and the CCD scanning unit configured with CCD 280 correspond to first image scanning unit 552. CIS scanning unit 220 corresponds to second image scanning unit 554.

Storage unit 560 stores scan data 562, determination level 564, reference pattern 566, and print setting 568. Reference pattern 566 is used for determining whether or not scan data 562 includes a bill or screen pattern (security information). Reference pattern 566 includes a bill pattern 566a, and a screen pattern (security pattern) 566b used for detecting a screen pattern (security information). In the present embodiment, RAM 294, ROM 296 and flash memory 298 correspond to storage unit 560. Display unit 570 indicates information concerning the inside of image processing apparatus 100 such as print setting 568. In the present embodiment, operation panel 310 corresponds to display unit 570.

Print unit 580 prints, on a sheet of paper, an image based on scan data 562, according to the result of the determination of determination unit 528. Print unit 580 includes an image forming unit 582 and an image output unit 584.

Image forming unit 582 generates image data (hereinafter referred to as output data) based on the result of the determination by determination unit 528 and print setting 568.

When image forming unit 582 receives the result of the determination that copy is to be permitted, image forming unit 582 performs image processing or the like based on the output condition set at print setting 568 for scan data 562, and generates output data. Image forming unit 582 generates such output data when, for example, it is determined that the original is not a bill, what is represented by a detected screen pattern indicates permission of copy, or a screen pattern indicating prohibition of copy is not detected from scan data.

When image forming unit 582 receives the result of the determination that copy is to be prohibited, image forming unit 582 does not generate the output data. Alternatively, image forming unit 582 may generate the output data such that characters such as "copy prohibited" overlap scan data 562. Image forming unit 582 generates such output data when, for example, it is determined that the original is a bill, or what is represented by the detected screen pattern indicates that copy is to be prohibited.

Image output unit 584 prints the output data generated by image forming unit 582 on a sheet of copy paper. Image output unit 584 may print the output data on a recording medium except for paper, such as film for example.

Facsimile transmission and reception unit 590 transmits facsimile data to another apparatus. Facsimile transmission and reception unit 590 also receives facsimile data from another apparatus. Network connection unit 595 connects image processing apparatus 100 and another apparatus by network.

Image processing apparatus 100 according to the first embodiment is used for bill recognition. A process performed by image processing apparatus 100 according to the first embodiment will be described in the following.

Image processing apparatus 100 according to the present embodiment calculates, for bill recognition, the rate of agreement of scan data 562 obtained by CIS scanning unit 220 or CCD 280 with bill pattern 566a. A higher rate of agreement can be regarded as indicating a greater resemblance to a bill. Therefore, image processing apparatus 100 determines that an original is a bill when the rate of agreement is equal to or higher than the set determination level 564. When the rate of agreement is not higher than determination level 564, image processing apparatus 100 determines that the original is not a bill.

Figure 6:
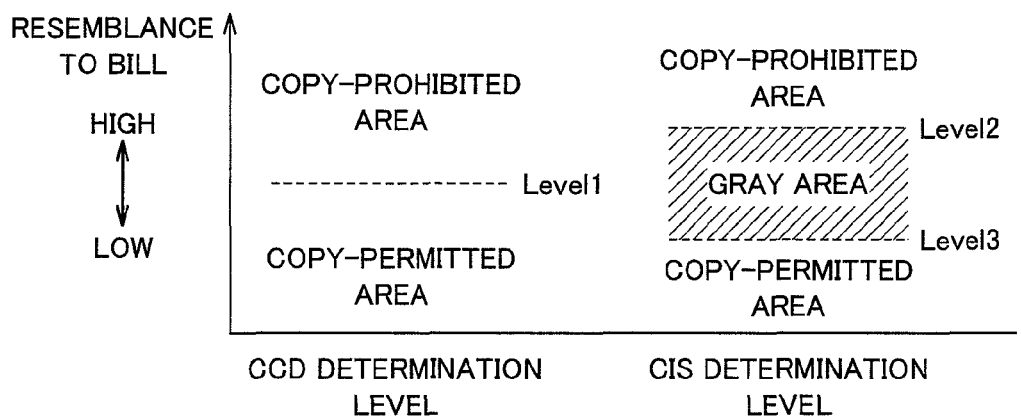
FIG. 6 is a diagram illustrating determination levels in a first embodiment.

In the present embodiment, determination level 564 that is used when it is determined whether or not an original is a bill based on scan data 562 obtained by CIS scanning unit 220, and determination level 564 that is used when it is determined whether or not an original is a bill based on scan data 562 obtained by CCD 280 are different from each other, which will be described with reference to FIG. 6. FIG. 6 is a diagram illustrating determination level 564 in the first embodiment.

Determination unit 528 determines, based on a first determination level, whether or not scan data 562 obtained by CCD 280 agrees with bill pattern 566a, and accordingly determines whether the original is a bill or not.

Specifically, when the rate of agreement of scan data 562 obtained by CCD 280 with bill pattern 566a is equal to or higher than the first determination level (hereinafter referred to Level 1), determination unit 528 determines that the original is a bill. When the rate of agreement is lower than Level 1, determination unit 528 determines that the original is not a bill.

Here, "rate of agreement" refers to a measure representing to what degree a face of an original agrees with a bill. Specifically, "rate of agreement" refers to the rate of agreement of a predetermined pattern included in scan data 562 as scanned, with bill pattern 566a.

In contrast, determination unit 528 uses a second determination level and a third determination level when determination unit 528 determines whether or not an original is a bill based on scan data 562 obtained by CIS scanning unit 220. It is supposed hereinafter that the value of the second determination level is "Level 2" and the value of the third determination level is "Level 3."

When the rate of agreement of scan data 562 obtained by CIS scanning unit 220 with bill pattern 566a is equal to or higher than Level 2, determination unit 528 determines that the original is a bill. When the rate of agreement is equal to or lower than Level 3, determination unit 528 determines that the original is not a bill. When the rate of agreement is between Level 2 and Level 3, determination unit 528 cannot determine whether the original is a bill or not. In other words, when the rate of agreement is between Level 2 and Level 3, determination unit 528 determines that whether the side of the original scanned by CIS scanning unit 200 includes bill pattern 566a is indeterminate.

Here, Level 2 is a value indicating a higher rate of agreement than Level 1. Further, Level 3 is a value indicating a lower rate of agreement than Level 1. The scanning accuracy of the CIS is lower than the scanning accuracy of the CCD. Therefore, the determination level value Level 2 used for determining that an original is surely a bill is set higher than Level 1. Further, the determination level value Level 3 used for determining that an original is surely not a bill is set lower than Level 1.

Figure 7:
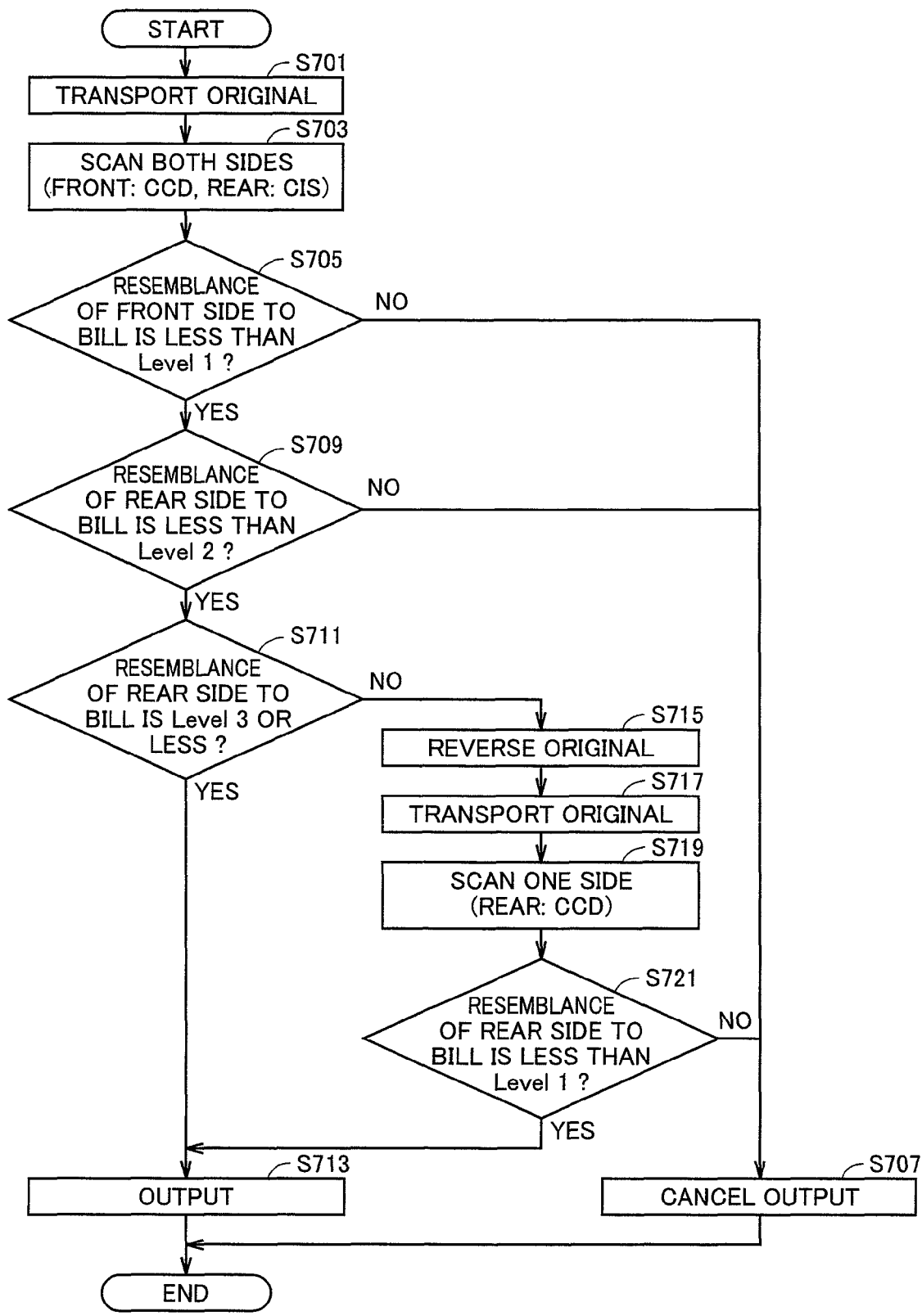
FIG. 7 is a flowchart showing a process performed by the image processing apparatus according to the first embodiment.

Referring to FIG. 7, a process performed by image processing apparatus 100 according to the first embodiment will be described. FIG. 7 is a flowchart showing the process performed by image processing apparatus 100 according to the first embodiment.

In step S701, CPU 292 controls transport roller 202 for example to transport an original.

In step S703, CPU 292 controls CIS scanning unit 220, CCD 280 and movable stage 260 for example to scan both sides of the original. CPU 292 causes CCD 280 to scan the upward-facing side (hereinafter referred to as front side) of the original set on original tray 120. Further, CPU 292 causes CIS scanning unit 220 to scan the side facing downward when set on original tray 120 (the side is hereinafter referred to as rear side).

In step S705, CPU 292 calculates the rate of agreement of scan data 562 obtained by CCD 280 with bill pattern 566a by means of pattern matching. CPU 292 then regards the calculated rate of agreement as a resemblance of the front side to a bill and determines whether or not the resemblance of the front side to a bill is less than Level 1.

It is supposed in the present embodiment that image processing apparatus 100 uses bill pattern 566a of only one side even when the apparatus is to recognize a duplex-printed bill such as Japanese bills. It should be noted that image processing apparatus 100 may store respective patterns of the two sides of a bill in storage unit 560 and determine whether or not the front side of an original scanned by CCD 280 agrees with the front side or rear side of the bill so as to authenticate the bill. The configuration as described above, however, requires a large storage capacity for storing the patterns of the two sides of a bill.

When the resemblance of the front side to a bill is not less than Level 1 (NO in step S705), CPU 292 causes in step S707 print unit 150 to cancel output of an image. This is for the reason that, when it is determined that the resemblance of scan data 562 obtained by CCD 280 to a bill is equal to or higher than Level 1, it is highly likely that the original is a bill. Through this process, image processing apparatus 100 can skip the steps from step S709 for determining the resemblance of the rear side to a bill. In this way, the speed of the process performed by image processing apparatus 100 can be increased.

When the resemblance of the front side to a bill is less than Level 1 (YES in step S705), CPU 292 performs pattern matching in step S709 between scan data 562 obtained by CIS scanning unit 220 and bill pattern 566a. CPU 292 then regards the rate of agreement of scan data 562 obtained by CIS scanning unit 220 with bill pattern 566a as the resemblance of the rear side to a bill, and determines whether or not the resemblance of the rear side to a bill is less than Level 2.

When the resemblance of the rear side to a bill is not less than Level 2 (NO in step S709), CPU 292 causes print unit 150 to cancel output of an image in step S707, since it is seen that the original is highly likely to be a bill when the result of the determination as to the rear side is the one as described above.

When the resemblance of the rear side to a bill is less than Level 2 (YES in step S709), CPU 292 determines in step S711 whether or not the resemblance of the rear side to a bill is equal to or less than Level 3.

When the resemblance of the rear side to a bill is equal to or less than Level 3 (YES in step S711), both of the front side and the rear side do not agree with the bill pattern. In other words, the original is not a bill. In this case, CPU 292 causes print unit 150 to output an image in step S713.

When the resemblance of the rear side to a bill is not equal to or less than Level 3 (NO in step S711), the resemblance of the rear side to a bill is between Level 2 and Level 3. Therefore, CPU 292 cannot determine that the rear side is a bill, and cannot determine that the rear side is not a bill. CPU 292 then performs the following steps to reverse the original and cause CCD 280 with a higher scanning accuracy to scan the rear side, and determines the resemblance of the rear side to a bill, based on the scan data.

In step S715, CPU 292 uses transport roller 211, transport roller 212 and flap 240 to reverse the original and return the original back to the transport path.

Then, in step S717, CPU 292 uses transport rollers 203-210 to transport the original.

In step S719, CPU 292 causes CCD 280 to scan the rear side of the original.

In step S721, CPU 292 performs pattern matching between scan data 562 obtained by CCD 280 and bill pattern 566a. CPU 292 then regards the rate of agreement of scan data 562 with bill pattern 566a as the resemblance of the rear side to a bill, and determines whether the resemblance of the rear side to a bill is less than Level 1.

When the resemblance of the rear side to a bill is less than Level 1 (YES in step S721), the original can be regarded as not a bill, and thus CPU 292 can cause print unit 150 to output an image in step S713.

When the resemblance of the rear side to a bill is not less than Level 1 (NO in step S721), it is highly likely that the rear side of the original is bill data, namely the original is highly likely to be a bill. In this case, CPU 292 causes print unit 150 to cancel output of an image in step S707.

In other words, image processing apparatus 100 according to the present embodiment causes the original to be scanned again when the rate of agreement of scan data 562 obtained by the CIS with a predetermined bill pattern is within a predetermined range including the determination level used for the determination as to the scan data obtained by the CCD. Image processing apparatus 100 thus operates in the above described manner to reduce the number of reversal operations and improve the scan accuracy.

An example has been described above where two determination levels are used for determining whether or not an original is a bill based on scan data 562 obtained by CIS scanning unit 220. CPU 292, however, may use only one determination level to determine whether or not an original is a bill, based on scan data 562 obtained by CIS scanning unit 220. For example, in the case where CPU 292 uses only the determination level of Level 3 to recognize a bill, the operation in step S709 of FIG. 7 is skipped.

It should be noted that in the case where the two determination levels are used like the present embodiment, the rate of agreement between an original and a bill can be determined with a higher accuracy.

While the case where image processing apparatus 100 is used for bill recognition has been described above, image processing apparatus 100 according to the present embodiment may be used for recognition of a special original whose copy is prohibited such as valuable paper and postage stamp, in addition to recognition of a bill. Further, image processing apparatus 100 may use screen pattern 566b representing information that copy is prohibited, instead of bill pattern 566a. In this case, image processing apparatus 100 can prevent unauthorized copy of an original provided with security screen pattern.

Second Embodiment

Image processing apparatus 100 according to the first embodiment prohibits copy when a predetermined pattern is detected on either the front side or the rear side.

Image processing apparatus 100 in a second embodiment prohibits copy when a predetermined pattern is not detected on either the front side or the rear side. In other words, image processing apparatus 100 permits copy only when a predetermined pattern is detected on the front side and the rear side. In particular, a description will be given here supposing that the predetermined pattern is a screen pattern representing information "copy permitted."

The hardware configuration and the functional configuration of image processing apparatus 100 in the second embodiment are substantially identical to those of the first embodiment. Therefore, the description thereof will not be repeated. It should be noted that the process performed by determination unit 528 differs from that of the first embodiment as described below.

Determination unit 528 of image processing apparatus 100 in the second embodiment determines whether or not a screen pattern that agrees with screen pattern 566b is embedded in an original.

Determination unit 528 makes a comparison between the rate of detection of the screen pattern in the image data which is obtained by scanning the original and determination level 564 to determine whether or not the screen pattern is embedded in the original.

Figure 8:
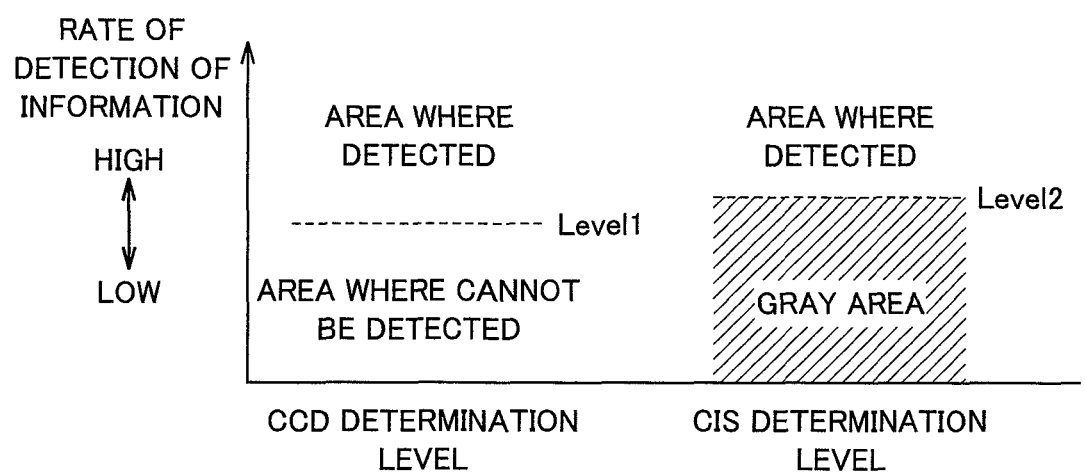
FIG. 8 is a diagram illustrating determination levels in a second embodiment.

Determination level 564 used in the second embodiment will be described with reference to FIG. 8. FIG. 8 is a diagram illustrating determination level 564 in the second embodiment.

Determination unit 528 determines whether or not an original scanned by the CCD includes a screen pattern based on a first determination level 564. The value of first determination level 564 is hereinafter referred to as "Level 1." When the rate of detection of the screen pattern in the scan data obtained by scanning with the CCD system is equal to or higher than Level 1, determination unit 528 determines that the original includes the screen pattern. When the rate of detection is less than Level 1, determination unit 528 determines that the original does not include the screen pattern.

In contrast, when the rate of detection of the screen pattern in the scan data obtained by scanning with the CIS is equal to or higher than Level 2 that is a second determination level, determination unit 528 determines that the original includes the screen pattern. When the rate of detection is less than Level 2, determination unit 528 determines that whether or not the original includes the screen pattern cannot be identified. Here, Level 2 is set higher than Level 1, since the accuracy of scanning by the CIS is lower than the accuracy of scanning by the CCD.

Figure 9:
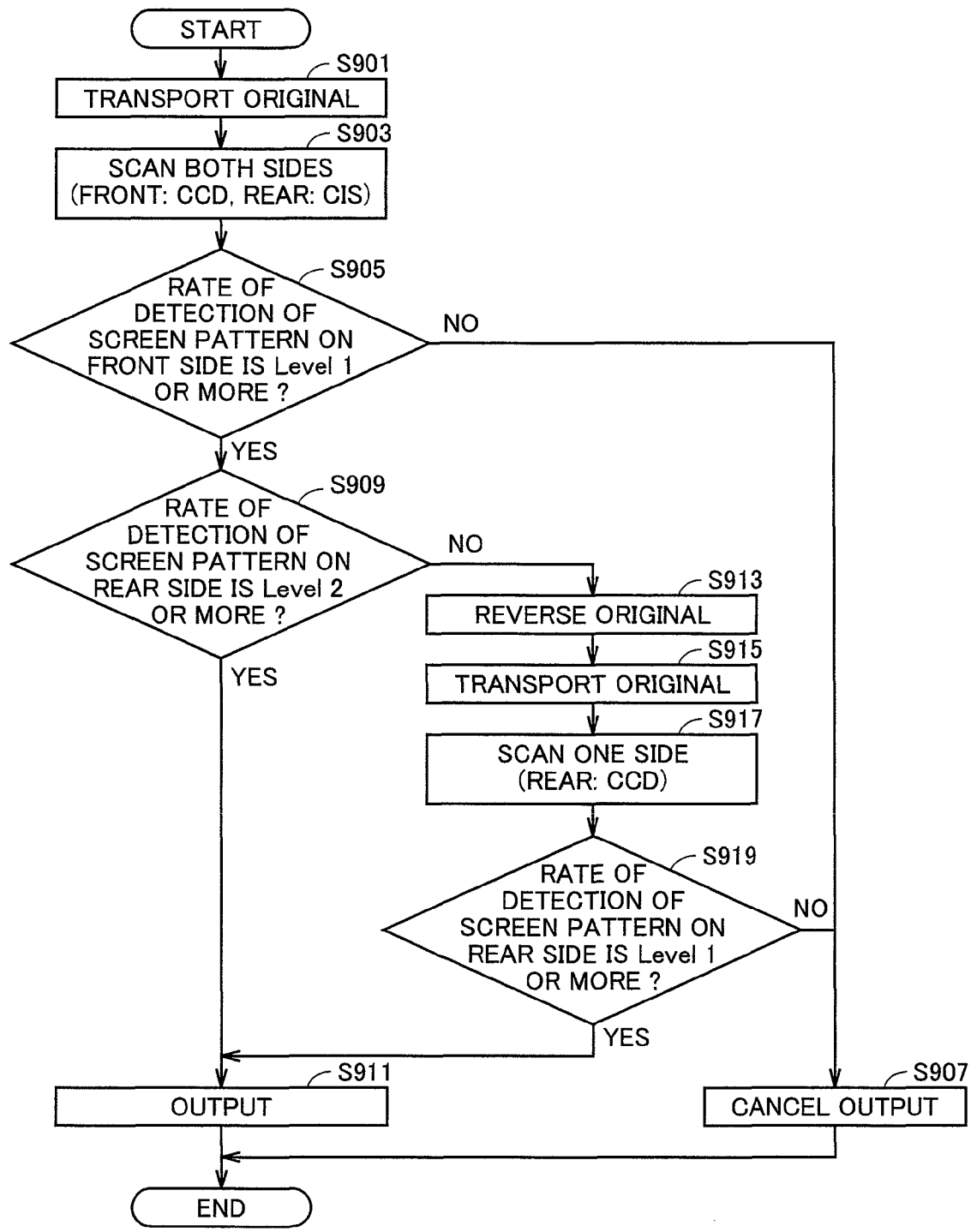
FIG. 9 is a flowchart showing a process performed by an image processing apparatus according to the second embodiment.

Referring to FIG. 9, a process performed by image processing apparatus 100 according to the second embodiment will be described. FIG. 9 is a flowchart showing the process performed by image processing apparatus 100 according to the second embodiment.

In step S901, CPU 292 controls transport roller 202 for example to transport an original.

In step S903, CPU 292 controls CIS scanning unit 220, CCD 280 and movable stage 260 for example to cause CCD 280 to scan the front side of the original. CPU 292 also causes CIS scanning unit 220 to scan the rear side of the original.

In step S905, CPU 292 uses pattern matching between scan data 562 of the front side obtained by CCD 280 and screen pattern 566b to calculate the rate of detection of the screen pattern on the front side. CPU 292 then determines whether the rate of detection of the screen pattern is equal to or higher than Level 1.

When the rate of detection of the screen pattern on the front side is not equal to or higher than Level 1 (NO in step S905), CPU 292 causes print unit 150 to cancel output of an image in step S907.

In the present embodiment, CPU 292 cancels output of an image regardless of the rate of detection of the screen pattern on the rear side. In this way, CPU 292 can surely prohibit copy of an original including a side whose copy is not permitted.

It should be noted that, in the case where the screen pattern for permitting copy is not embedded in one side of the original while the screen pattern for permitting copy is embedded in the other side, image processing apparatus 100 cannot copy the side where the screen pattern for permitting copy is embedded if the apparatus performs the process in the above-described manner. Accordingly, CPU 292 may prohibit only the output by print unit 150 of the side where the rate of detection of the screen pattern is low in step S907.

CPU 292 herein cancels the output of an image in step S907. CPU 292, however, may cause print unit 150 to restrict the complete copy of an original, for example, to output an image where the characters "copy prohibited" overlap, instead of canceling output of an image.

When the rate of detection of the screen pattern on the front side is equal to or higher than Level 1 (YES in step S905), CPU 292 calculates in step S909 the rate of detection of the screen pattern on the rear side through pattern matching between scan data 562 of the rear side obtained by CIS scanning unit 220 and screen pattern 566b. CPU 292 then determines whether the rate of detection of the screen pattern is equal to or higher than Level 2.

When the rate of detection of the screen pattern on the rear side is equal to or higher than Level 2 (YES in step S909), the screen pattern is detected on both of the front side and the rear side. In other words, copy of both the front and rear sides of the original is permitted. CPU 292 accordingly causes print unit 150 to output an image in step S911.

When the rate of detection of the screen pattern on the rear side is not equal to or higher than Level 2 (NO in step S909), CPU 292 cannot determine whether the screen pattern is embedded in the rear side. CPU 292 accordingly performs a series of steps as described below to reverse the original and cause CCD 280 having a higher scanning accuracy to scan the rear side so as to determine whether or not the rear side includes the screen pattern based on the scan data 562.

First, CPU 292 uses transport roller 211, transport roller 212 and flap 240 to reverse the original and return the original back to the transport path in step S913.

Next, CPU 292 causes transport rollers 203-210 to transport the original in step S915.

In step S917, CPU 292 causes CCD 280 to scan the rear side of the original.

In step S919, CPU 292 calculates the rate of detection of the screen pattern in the image data through pattern matching between scan data 562 of the rear side obtained by CCD 280 and screen pattern 566b. CPU 292 then determines whether the rate of detection of the screen pattern on the rear side is equal to or higher than Level 1.

When the rate of detection of the screen pattern on the rear side is equal to or higher than Level 1 (YES in step S919), CPU 292 causes print unit 150 to output an image in step S911.

When the rate of detection of the screen pattern on the rear side is not equal to or higher than Level 1 (NO in step S919), CPU 292 causes print unit 150 to cancel output of an image in step S907.

While an example has been described above where CPU 292 uses one determination level 564 to determine whether or not the rear side includes the screen pattern based on scan data 562 of the rear side that is obtained by CIS scanning, CPU 292 may use two determination levels 564 to determine whether or not the rear side includes the screen pattern, like the first embodiment.

Figure 10:
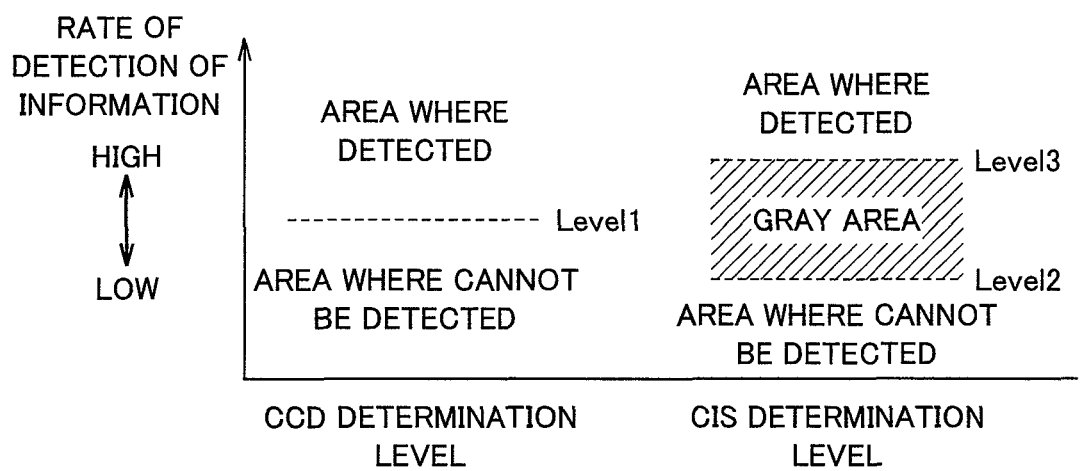
FIG. 10 is a diagram showing a modification of the determination levels set in the second embodiment.

Specifically, referring to FIG. 10, two determination levels 564 (Level 2 and Level 3) are set. FIG. 10 is a diagram illustrating a modification of determination level 564 that is set in the second embodiment. The value of determination level 564 (Level 1) used by determination unit 528 for determining whether or not an original includes the screen pattern based on image data obtained by CCD scanning is similar to the above-described one.

Determination unit 528 uses determination levels 564 that are Level 2 and Level 3 when determination unit 528 determines from the result of CIS scanning whether or not the original includes the screen pattern. When the rate of detection of the screen pattern is equal to or lower than Level 2, determination unit 528 determines that the original does not include the screen pattern. Here, Level 2 is a value representing a lower rate of detection than Level 1. Further, determination unit 528 determines that the original includes the screen pattern when the rate of detection is equal to or higher than Level 3. Here, Level 3 is a value representing a higher rate of detection than Level 1.

When the rate of detection is between Level 2 and Level 3, determination unit 528 determines that whether or not the original includes the screen pattern cannot be identified. Since the CIS scanning accuracy is lower than the CCD scanning accuracy, the value Level 2 of the determination level used for determining that the original surely does not include the screen pattern is set lower than Level 1, and the value Level 3 of the determination level used for determining that the original surely includes the screen pattern is set higher than Level 1.

Figure 11:
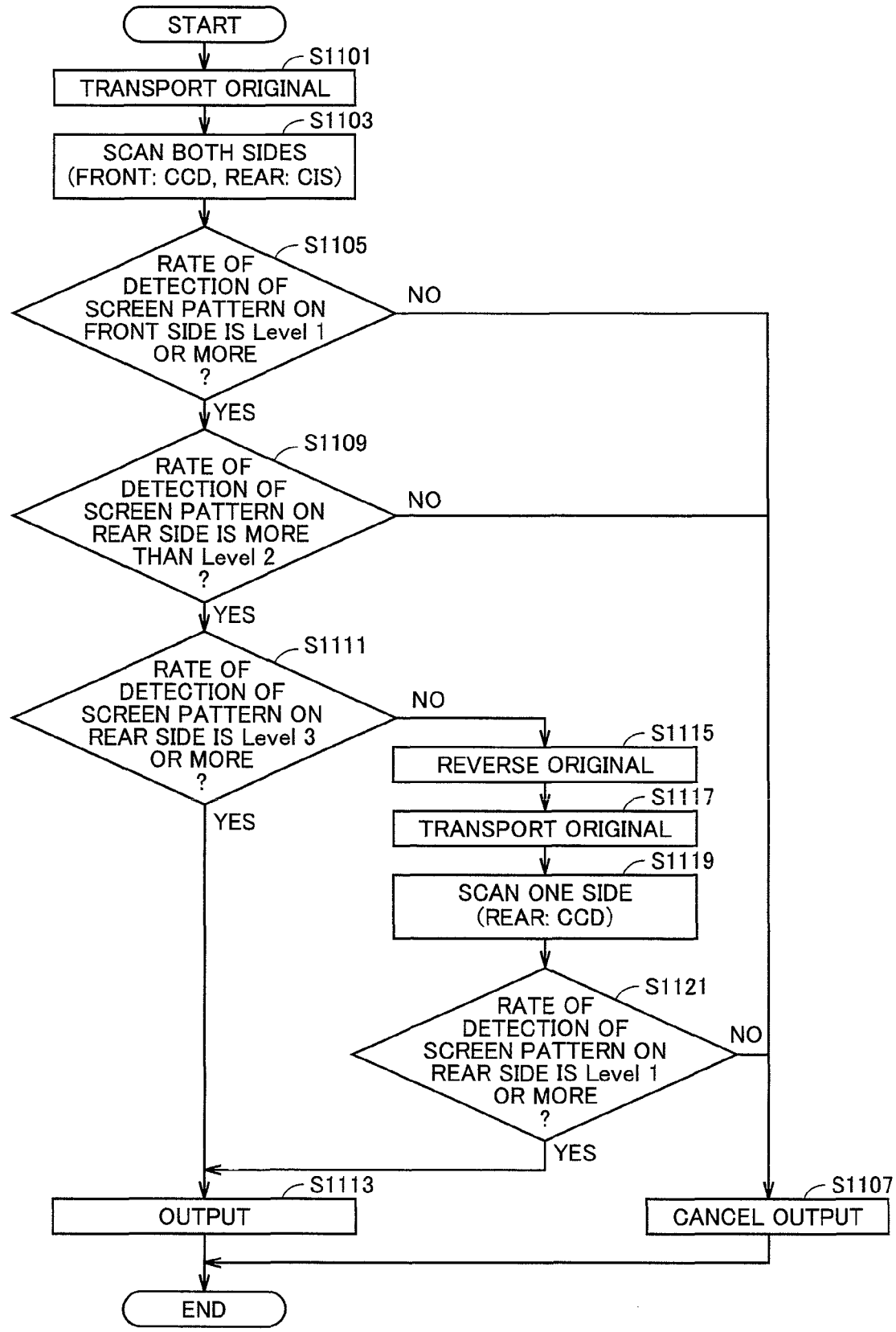
FIG. 11 is a flowchart showing a process performed by the image processing apparatus according to the modification of the second embodiment.

A process performed by image processing apparatus 100 in the case where determination levels 564 as described above are used will be described with reference to FIG. 11. FIG. 11 is a flowchart showing the process performed by image processing apparatus 100 according to the modification of the second embodiment.

In step S1101, CPU 292 controls transport roller 202 for example to transport an original.

In step S1103, CPU 292 controls CIS scanning unit 220, CCD 280 and movable stage 260 for example to cause CCD 280 to scan the front side of the original. CPU 292 also causes CIS scanning unit 220 to scan the rear side.

In step S1105, CPU 292 calculates the rate of detection of the screen pattern on the front side through pattern matching between scan data 562 of the front side obtained by CCD 280 and screen pattern 566*b*. CPU 292 then determines whether the rate of detection of the screen pattern is equal to or higher than Level 1.

When the rate of detection of the screen pattern on the front side is not equal to or higher than Level 1 (NO in step S1105), CPU 292 causes print unit 150 to cancel output of an image in step S1107.

When the rate of detection of the screen pattern on the front side is equal to or higher than Level 1 (YES in step S1105), CPU 292 calculates in step S1109 the rate of detection of the screen pattern on the rear side through pattern matching between scan data 562 of the rear side obtained by CIS scanning unit 220 and screen pattern 566*b*. CPU 292 then determines whether the rate of detection of the screen pattern is higher than Level 2.

When the rate of detection of the screen pattern on the rear side is not higher than Level 2 (NO in step S1109), CPU 292 causes print unit 150 to cancel output of an image in step S1107.

When the rate of detection of the screen pattern on the rear side is higher than Level 2 (YES in step S1109), CPU 292 determines in step S1111 whether the rate of detection of the screen pattern on the rear side is equal to or higher than Level 3.

When the rate of detection of the screen pattern on the rear side is equal to or higher than Level 3 (YES in step S1111), the screen pattern is detected on both of the front side and the rear side. Namely, copy of both the front and rear sides of the original is permitted. In this case, CPU 292 causes print unit 150 to output an image in step S1113.

When the rate of detection of the screen pattern on the rear side is not equal to or higher than Level 3 (NO in step S1111), CPU 292 cannot determine whether or not the screen pattern is embedded in the rear side. CPU 292 accordingly performs a series of steps as described below to reverse the original and cause CCD 280 with a higher scanning accuracy to scan the rear side so as to determine, from the scan data, whether or not the rear side includes the screen pattern.

First, CPU 292 uses transport roller 211, transport roller 212 and flap 240 to reverse the original and return the original back to the transport path in step S1115.

Then, CPU 292 causes transport rollers 203-210 to transport the original in step S1117.

In step S1119, CPU 292 causes CCD 280 to scan the rear side of the original.

In step S1121, CPU 292 calculates the rate of detection of the screen pattern in the image data through pattern matching between scan data 562 of the rear side that is obtained by CCD 280 and screen pattern 566*b*. CPU 292 then determines whether the rate of detection of the screen pattern on the rear side is equal to or higher than Level 1.

When the rate of detection of the screen pattern on the rear side is equal to or higher than Level 1 (YES in step S1121), CPU 292 causes print unit 150 to output an image in step S1113.

When the rate of detection of the screen pattern on the rear side is not equal to or higher than Level 1 (NO in step S1121), CPU 292 causes print unit 150 to cancel output of an image in step S1107.

According to the present modification, image processing apparatus 100 may not perform the process steps such as reversal and re-scanning of an original for which it is determined in step S1109 that the original does not surely include the screen pattern. In this way, the modification can reduce the number of process steps.

Third Embodiment

In connection with a third embodiment, image processing apparatus 100 will be described having the security screen pattern capability using a plurality of different types of screen patterns.

In general, the easiness of detection of a screen pattern embedded in an original varies depending on the type of the screen pattern. Accordingly, the type of the screen pattern is changed according to the type of information to be embedded. For example, in an original, important information such as the information that copy is permitted/prohibited and password may be embedded as an easy-to-detect screen pattern, and other information may be embedded as a difficult-to-detect screen pattern.

When such an original is scanned, the easy-to-detect screen pattern is detected while the difficult-to-detect screen pattern may not be detected in some cases. In the case where a screen pattern that is easier to detect, for example, an important screen pattern such as the one indicating that copy is permitted/prohibited is detected, it may become unnecessary at this time to know the information of the difficult-to-detect screen pattern, depending on the information of the easy-to-detect screen pattern. Image processing apparatus 100 according to the present embodiment uses the difference in easiness to detect according to the type of screen pattern to reduce the number of times an original is scanned. In the following description, the difference in easiness to detect according to the type of the screen pattern corresponds to the easiness to make a determination in pattern matching described hereinlater, namely the easiness to recognize a pattern. The factor of the difference in easiness to detect, however, is not limited to the above-described one.

The hardware configuration and the functional configuration of image processing apparatus 100 according to the third embodiment are substantially identical to those of the first and second embodiments. Therefore, the description thereof will not be repeated. It should be noted that the process performed by determination unit 528 differs from those of the first and second embodiments as described below.

Figure 12:
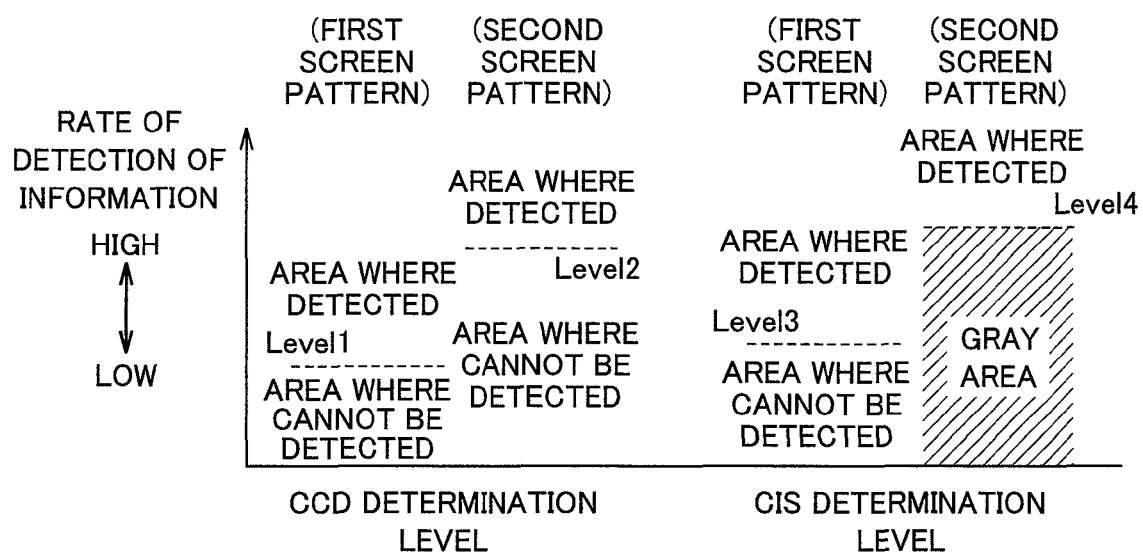
FIG. 12 is a diagram illustrating determination levels set in a third embodiment.

Image processing apparatus 100 according to the present embodiment also uses determination level 564 for determining whether or not an original includes a screen pattern, like other embodiments. This determination level 564 will be described with reference to FIG. 12. FIG. 12 is a diagram illustrating determination level 564 set in the third embodiment.

In the present embodiment, a screen pattern included in an original includes a first screen pattern that is relatively easy to detect and a second screen pattern that is relatively difficult to detect.

When the rate of detection of the first screen pattern in scan data obtained by scanning with the CCD is equal to or higher than Level 1, determination unit 528 determines that the original includes the first screen pattern and, when the rate of detection of the first screen pattern is not equal to or higher than Level 1, determination unit 528 determines that the original does not include the first screen pattern.

When the rate of detection of the second screen pattern in the scan data obtained by scanning with the CCD is equal to or higher than Level 2, determination unit 528 determines that the original includes the second screen pattern. When the rate of detection of the second screen pattern is not equal to or higher than Level 2, determination unit 528 determines that the original does not include the second screen pattern.

Here, Level 2 is set higher than Level 1, in order to avoid the possibility that an erroneous determination is made as to the second screen pattern that is more difficult to detect than the first screen pattern. It should be noted that the relative magnitudes of Level 1 and Level 2, however, are not limited to the above-described ones, and are set appropriately according to the nature of the screen pattern.

When the rate of detection of the first screen pattern in the scan data obtained by scanning with the CIS is equal to or higher than Level 3, determination unit 528 determines that the original includes the first screen pattern. When the rate of detection of the first screen pattern is not equal to or higher than Level 3, determination unit 528 determines that the original does not include the first screen pattern.

Further, when the rate of detection of the second screen pattern in the scan data obtained by scanning with the CIS is equal to or higher than Level 4, determination unit 528 determines that the original includes the second screen pattern. When the rate of detection of the second screen pattern is not equal to or higher than Level 4, determination unit 528 determines that whether or not the original includes the second screen pattern cannot be identified.

Here, for a similar reason to the reason why Level 2 is set higher than Level 1, Level 4 is set higher than Level 3. It should be noted that the relative magnitudes of Level 3 and Level 4 are not limited to the above-described ones, and are appropriately set according to the nature of the screen pattern.

Further, as described in connection with the first embodiment and the second embodiment, since the scanning accuracy of the CIS system is lower than the scanning accuracy of the CCD system, Level 3 and Level 4 are set higher than Level 1 and Level 2 respectively.

Figure 13:
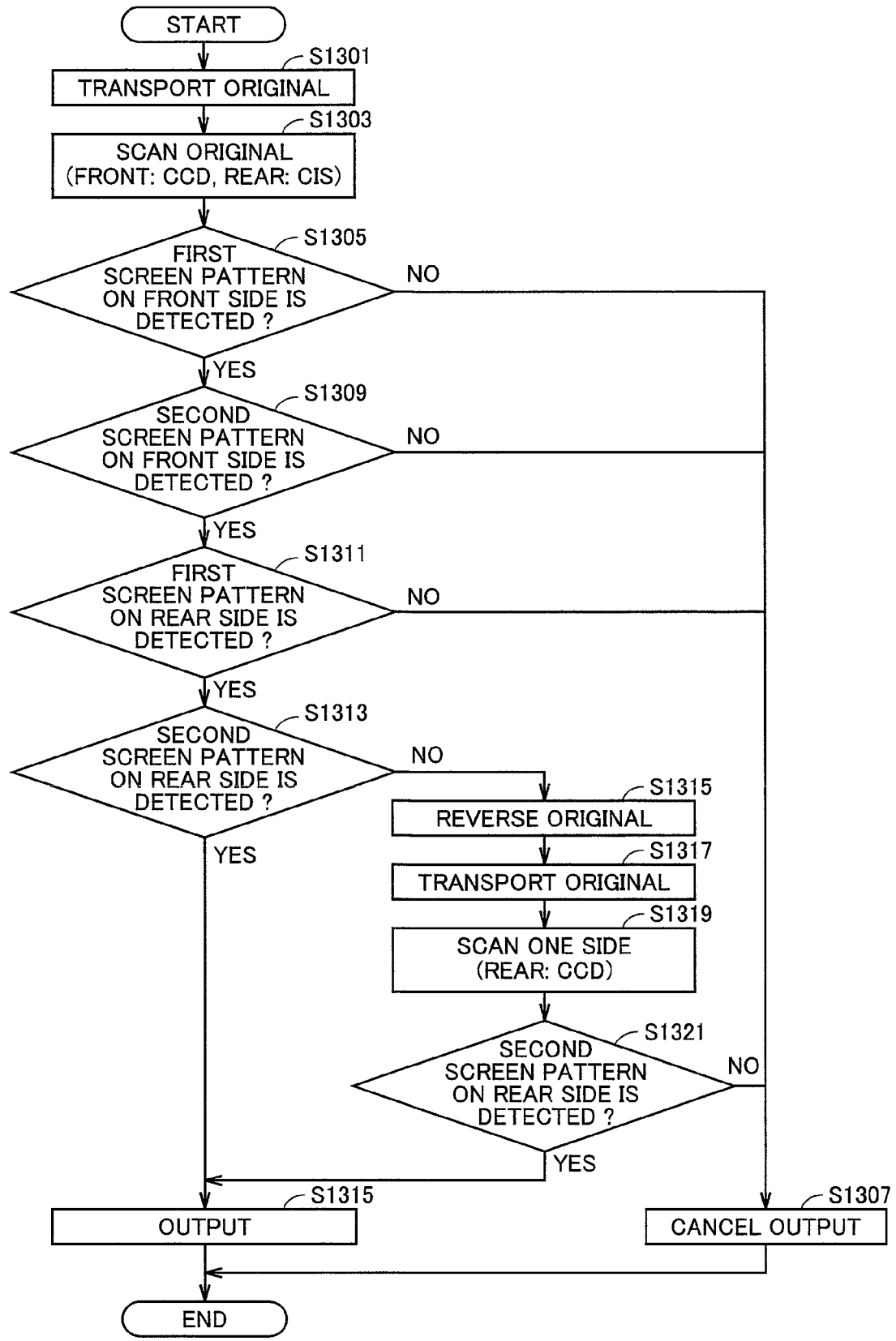
FIG. 13 is a flowchart showing a process performed by an image processing apparatus according to the third embodiment.

Referring to FIG. 13, a process performed by image processing apparatus 100 according to the third embodiment will be described.

Here, a first screen pattern represents the information that copy is permitted, and a second screen pattern represents the information concerning print such as printed date and time and the name of the apparatus used for printing. When the first screen pattern and the second screen pattern are detected, copy of the original is permitted.

In step S1301, CPU 292 controls transport roller 202 for example to transport an original.

In step S1303, CPU 292 controls CIS scanning unit 220, CCD 280 and movable stage 260 for example to scan both sides of the original. CPU 292 causes CCD 280 to scan the front side of the original and causes CIS scanning unit 220 to scan the rear side of the original.

In step S1305, CPU 292 calculates the rate of detection of the first screen pattern on the front side through pattern matching between image data of the front side obtained by CCD 280 and the screen pattern. CPU 292 then determines whether the rate of detection of the first screen pattern is equal to or higher than Level 1.

When the rate of detection of the first screen pattern on the front side is not equal to or higher than Level 1 (NO in step S1305), copy of the front side is not permitted. Therefore, CPU 292 causes print unit 150 to cancel output of an image in step S1307.

When the rate of detection of the first screen pattern on the front side is equal to or higher than Level 1 (YES in step S1305), CPU 292 determines whether the rate of detection of the second screen pattern on the front side is equal to or higher than Level 2 in step S1309.

When the rate of detection of the second screen pattern on the front side is not equal to or higher than Level 2 (NO in step S1309), CPU 292 causes print unit 150 to cancel output of an image in step S1307.

In the present embodiment, CPU 292 causes the output to be cancelled regardless of the rate of detection of the screen pattern on the rear side, if the first screen pattern or the second screen pattern is not detected on the front side. In this way, CPU 292 can surely prohibit copy of an original that includes a side whose copy is not permitted.

This process, however, causes the state where image processing apparatus 100 does not copy the rear side even if copy of the rear side is permitted. Accordingly, CPU 292 may cause print unit 150 to cancel only the output of a side whose copy is not permitted in step S1307.

Here, CPU 292 causes the output of an image to be cancelled in step S1307. CPU 292, however, may causes print unit 150 to perform another operation for restricting complete copy of an original, for example, to output the characters "copy prohibited" overlapping the image, instead of canceling the output of the image.

When the rate of detection of the second screen pattern on the front side is equal to or higher than Level 2 (YES in step S1309), CPU 292 calculates in step S1311 the rate of detection of the first screen pattern on the rear side through pattern matching between image data of the rear side obtained by CIS scanning unit 220 and the screen pattern. CPU 292 then determines whether the rate of detection of the first screen pattern is equal to or higher than Level 3.

When the rate of detection of the first screen pattern on the rear side is not equal to or higher than Level 3 (NO in step S1311), copy of the rear side is not permitted. Therefore, CPU 292 causes print unit 150 to cancel output of an image in step S1307.

When the rate of detection of the first screen pattern on the rear side is equal to or higher than Level 3 (YES in step S1311), CPU 292 calculates in step S1313 the rate of detection of the second screen pattern on the rear side through pattern matching between image data of the rear side obtained by CIS scanning unit 220 and the screen pattern. CPU 292 then determines whether the rate of detection of the second screen pattern is equal to or higher than Level 4.

When the rate of detection of the second screen pattern on the rear side is equal to or higher than Level 4 (YES in step S1313), copy of both of the front side and the rear side is permitted. Accordingly, CPU 292 causes print unit 150 to output an image in step S1315.

When the rate of detection of the second screen pattern on the rear side is not equal to or higher than Level 4 (NO in step S1313), CPU 292 cannot determine whether or not the second screen pattern is embedded in the rear side. Accordingly, CPU 292 performs a series of process steps as described below to reverse the original, cause CCD 280 with a higher scanning accuracy to scan the rear side, and determine whether or not the rear side includes the screen pattern based on the scan data.

First, CPU 292 uses transport roller 211, transport roller 212 and flap 240 to reverse the original and return the original back to the transport path in step S1315.

Then, CPU 292 causes transport rollers 203-210 to transport the original in step S1317.

In step S1319, CPU 292 causes CCD 280 to scan the rear side of the original.

In step S1321, CPU 292 calculates the rate of detection of the second screen pattern in the image data through pattern matching between the image data of the rear side obtained by CCD 280 and the screen pattern. CPU 292 then determines whether the rate of detection of the second screen pattern on the rear side is equal to or higher than Level 2.

When the rate of detection of the second screen pattern on the rear side is equal to or higher than Level 2 (YES in step S1321), CPU 292 causes print unit 150 to output an image in step S1315.

When the rate of detection of the second screen pattern on the rear side is not equal to or higher than Level 2 (NO in step S1321), CPU 292 causes print unit 150 to cancel output of an image in step S1307.

Image processing apparatus 100 according to the present embodiment determines whether or not each of screen patterns that are different in type from each other is included in an original, according to the degree of easiness or the degree of difficulty in detecting the screen pattern depending on the type of the screen pattern. This image processing apparatus 100 can thus reduce the number of process steps necessary for detecting the screen pattern.

An example has been described above where one determination level (Level 4) 564 is used by CPU 292 for determining whether or not the rear side includes the second screen pattern based on image data of the rear side obtained by scanning with the CIS system. CPU 292, however, may use two determination levels 564 to make the determination, like other embodiments described above.

Further, image processing apparatus 100 in the present embodiment has been described as the one permitting copy of an original when the first screen pattern and the second screen pattern are detected. The relation between the result of detection of a predetermined pattern and subsequent process steps is not limited to this. For example, if the first screen pattern represents information that copy is prohibited, image processing apparatus 100 may prohibit copy of an original when the first screen pattern is detected. Where this is described in connection with FIG. 13, the determinations YES and NO of steps S1305 and S1311 are replaced with each other.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image scanning apparatus comprising:
   a first scanner for scanning a first side of an original with a first scanning accuracy to generate first image data;
   a second scanner for scanning a second side of said original with a second scanning accuracy lower than said first scanning accuracy to generate second image data;
   a determination unit for determining whether or not each of said first image data and said second image data includes a predetermined pattern; and
   a control unit for causing said first scanner to scan said second side when said determination unit determines that whether said second image data includes said predetermined pattern is indeterminate, and causing said first scanner not to scan said second side when said determination unit determines that said second image data includes said predetermined pattern.

2. The image scanning apparatus according to claim 1, further comprising:
   a calculation unit calculating a degree to which each of said first and second image data includes said predetermined pattern; and
   said determination unit determines, based on said degree, whether or not each of said first image data and said second image data includes said predetermined pattern, and
   said control unit controls said first scanner such that said first scanner scans said second side when said degree of said second image falls within a predetermined range.

3. The image scanning apparatus according to claim 2, wherein
   said determination unit determines that said first image data includes said predetermined pattern when said degree of said first image data exceeds a first criterion, determines that said first image data does not include said predetermined pattern when said degree of said first image data does not exceed said first criterion, determines that said second image data includes said predetermined pattern when said degree of said second image data exceeds a second criterion, and determines that said second image data does not include said predetermined pattern when said degree of said second image data does not exceed a third criterion.

4. The image scanning apparatus according to claim 3, wherein
said predetermined range is not less than said third criterion and not more than said second criterion.

5. The image scanning apparatus according to claim 1, wherein
when said determination unit determines that said first image data includes said predetermined pattern, said control unit keeps said first scanner from scanning said second side regardless of a result of determination for said second side by said determination unit.

6. The image scanning apparatus according to claim 5, wherein
said predetermined pattern is a pattern representing prohibition of output of image data, and
when said determination unit determines that said first image data or said second image data includes said predetermined pattern, said control unit prohibits output of respective images corresponding to said first image data and said second image data.

7. The image scanning apparatus according to claim 6, wherein
said predetermined pattern is a pattern for identifying said original as a bill.

8. The image scanning apparatus according to claim 1, wherein
when said determination unit determines that said first image data does not include said predetermined pattern, said control unit keeps said first scanner from scanning said second side regardless of a result of determination for said second side by said determination unit.

9. The image scanning apparatus according to claim 8, wherein
said predetermined pattern is a pattern representing permission of output of said first image data and said second image data and, when said determination unit determines that neither said first image data nor said second image data includes said predetermined pattern, said control unit prohibits output of respective images corresponding to said first image data and said second image data.

10. The image scanning apparatus according to claim 1, further comprising:
a transport unit transporting said original; and
a reversal unit reversing said original when said original whose second side is scanned by said second scanner is transported to said first scanner by said transport unit, wherein
said control unit causes said first scanner to scan said second side by controlling said transport unit and said reversal unit.

11. The image scanning apparatus according to claim 1, wherein
when said determination unit determines that said first image data includes said predetermined pattern, said control unit keeps said first scanner from scanning said second side regardless of a result of determination by said determination unit on said second image data, and cancels output of said first image data and said second image data.

* * * * *